United States Patent
Hook et al.

(10) Patent No.: US 10,701,367 B2
(45) Date of Patent: Jun. 30, 2020

(54) METHOD FOR ENCODING RAW HIGH FRAME RATE VIDEO VIA AN EXISTING HD VIDEO ARCHITECTURE

(71) Applicant: Raytheon Company, Waltham, MA (US)

(72) Inventors: Tyler L. Hook, Little Elm, TX (US); David M. Zimmerman, La Mesa, CA (US); Anthony Santamaria, Dallas, TX (US)

(73) Assignee: Raytheon Company, Waltham, MA (US)

( * ) Notice: Subject to any disclaimer, the term of this patent is extended or adjusted under 35 U.S.C. 154(b) by 5 days.

(21) Appl. No.: 15/672,499

(22) Filed: Aug. 9, 2017

(65) Prior Publication Data

US 2019/0052887 A1 Feb. 14, 2019

(51) Int. Cl.
| | |
|---|---|
| *H04N 19/154* | (2014.01) |
| *H04N 19/132* | (2014.01) |
| *G06F 16/71* | (2019.01) |
| *H04N 21/434* | (2011.01) |
| *H04N 21/236* | (2011.01) |

(Continued)

(52) U.S. Cl.
CPC ........... *H04N 19/154* (2014.11); *G06F 16/71* (2019.01); *H04N 7/0102* (2013.01); *H04N 7/015* (2013.01); *H04N 7/0122* (2013.01); *H04N 19/132* (2014.11); *H04N 21/23602* (2013.01); *H04N 21/4342* (2013.01)

(58) Field of Classification Search
CPC .............. H04N 19/154; H04N 19/132; G06F 17/30858
See application file for complete search history.

(56) References Cited

U.S. PATENT DOCUMENTS 4,363,104 A * 12/1982 Nussmeier .......... G06F 15/8015
348/625
9,497,457 B1 11/2016 Gupta
(Continued)

FOREIGN PATENT DOCUMENTS

EP 3038373 B1 6/2016

OTHER PUBLICATIONS

Nigel Seth-Smith, et al., "6G SDI for UHDTV-1, 4K and 3D Production," IBC 2013 Conference, Sep. 12-17, 2013, Amsterdam, XP030082459.

(Continued)

*Primary Examiner* — Dave Czekaj
*Assistant Examiner* — Berteau Joisil
(74) *Attorney, Agent, or Firm* — Burns & Levinson, LLP; Joseph M. Maraia

(57) ABSTRACT

A system for transporting fast frame rate video data from a high frame rate image sensor mosaics and spreads the fast frame rate video data in 1920×1080p30 video frames for transporting via an existing standard video architecture. Packing information, spreading information, and unique ID/timestamps for each frame is encoded in metadata and inserted in ancillary metadata space of the 1080p30 video frames. A robust encoding scheme generates the metadata and ensures that the transported video can be reassembled into its original fast frame rate form after being spread over multiple channels.

19 Claims, 3 Drawing Sheets

(51) Int. Cl.
*H04N 7/01* (2006.01)
*H04N 7/015* (2006.01)

(56) References Cited

U.S. PATENT DOCUMENTS

| | | | | |
|---|---|---|---|---|
| 2012/0293710 | A1* | 11/2012 | Yamashita | H04N 7/015 348/445 |
| 2014/0169446 | A1* | 6/2014 | Yang | H04N 19/172 375/240.02 |
| 2018/0262693 | A1* | 9/2018 | Yuan | H03M 7/3062 |

OTHER PUBLICATIONS

International Search Report and Written Opinion from related PCT Application No. PCT/US2018/030591, dated Aug. 1, 2018.

\* cited by examiner

METHOD FOR ENCODING RAW HIGH FRAME RATE VIDEO VIA AN EXISTING HD VIDEO ARCHITECTURE

GOVERNMENT LICENSE RIGHTS

This invention was made with Government support. The Government has certain rights in the invention.

FIELD OF TECHNOLOGY

The present disclosure is in the field of image processing architectures and more particularly in the field of high frame rate video processing.

BACKGROUND

High frame rate image sensors, which have a large image format and small pixel pitch, are becoming commonly available for use in numerous new products and applications. However, conventional video architectures generally do not support bandwidth and timing requirements of some high framerate image sensors. New video architectures that support the bandwidth and timing requirements of high frame rate image sensors have been developed; however, these new video architectures are generally developed from scratch for particular uses without taking advantage of previously available hardware.

Improvements in high frame rate image sensor technologies vastly exceed bandwidth and transport capabilities of many existing video transport architectures. An extensive infrastructure of existing video hardware that is designed and configured for transporting high definition (HD) video is deployed and installed in equipment throughout the world. This infrastructure generally does not support transport of video data from the high frame rate video cameras to a display or end-user.

Existing HD video architectures are generally configured for processing streams of video data that conform to one or more standard formats such as the Society of Motion Picture and Television Engineers (SMPTE) standards SMPTE 292M and SMPTE 424M, for example. These standards include a 720p high definition television (HDTV) format, in which video data is formatted in frames having 720 horizontal data paths and an aspect ratio of 16:9. The SMPTE 292M standard includes a 720p format which has a resolution of 1280×720 pixels, for example.

A common transmission format for HD video data is 720p60, in which the video data in 720p format is transmitted at 60 frames per second. The SMPTE 424M standard includes a 1080p60 transmission format in which data in 1080p format is transmitted at 60 frames per second. The video data in 1080p format is sometimes referred to as "full HD" and has a resolution of 1920×1080 pixels.

A large number of currently deployed image detection systems are built in conformance with HD video standards, such as the commonly used 720p standard. The 1280×720 pixel frames of a 720p standard system include about 1.5 megapixels per frame. In contrast, High frame rate image sensors generally output image frames in 5 k×5 k format, which have about 25 million pixels per frame. Therefore, the 1280×720 pixels used in a 720p standard system are not nearly enough to transport the much larger number of pixels generated by an high frame rate image sensor.

High frame rate image sensors are conventionally used with video architectures that are designed particularly for transporting high frame rate video data. These new video architectures generally leverage video compression techniques to support high frame rate bandwidth and timing requirements. Some video architectures that are currently used for transporting high frame rate video data use parallel encoders or codecs and data compression to transport the high frame rate video. However, the use of compression makes these video architectures unsuitable for end users who rely on receiving raw sensor data.

The use of legacy hardware for transporting high frame rate video from next generation cameras is problematic because the legacy hardware generally does not provide sufficient bandwidth. Moreover, replacing existing video architectures with new architectures for transporting high frame rate video data can be impractical and/or prohibitively expensive for users who have already implemented a large amount of conventional video processing equipment.

Various spatial and temporal video compression techniques have been used to process image data from high frame rate image sensors for transport over existing HD video architectures. The high frame rate video data is commonly compressed using compression algorithms that retain enough of the high frame rate video data to generate visible images and video streams for human viewing, but lose or discard data from the high frame rate image sensors that may not be needed for human viewable images and video streams.

Other conventional techniques for processing data from high frame rate image sensors generally involve the use of new or proprietary video architectures that have been developed for particular applications of the high frame rate image sensors. These techniques are costly and inefficient because they do not take advantage of widely available HD video architectures that have been deployed throughout the world.

SUMMARY

Aspects of the present disclosure include a high frame rate image sensor data processing apparatus and method for efficient and lossless collection of high frame rate data. A sensor data processing apparatus according to an aspect of the present disclosure includes a raw high frame rate data input path coupled to processing circuitry and a plurality of image data output paths coupled in parallel to the processing circuitry. One or more metadata output paths are coupled to the processing circuitry in parallel with the image data output paths.

The processing circuitry is configured to receive the raw high frame rate data from a high frame rate image sensor, mosaic the small fast frame data into lossless segments and direct the lossless segments in parallel onto the image data output paths. The processor circuitry is also configured to generate metadata including encoded information that facilitates reconstruction of the raw fast frame rate data from the lossless segments, and direct the metadata onto the metadata output paths.

Improved methods and apparatus for transporting video data from high frame rate image sensors to a display or to an end-user via the current video transport architectures as described herein include pixel packing methods and methods of using multiple physical connections to transmit data in parallel. The methods disclosed herein overcome bandwidth limitations of legacy hardware and enable legacy hardware to transport high frame rate video data from next generation cameras.

According to an aspect of the present disclosure, video processing is performed to reassemble video image data as mosaic tiles based on metadata that is used to track packet information. Back-end video processing can be performed to reassemble the video as mosaic tiles or stitched panoramic imagery based on the location data and inertial data that is included in the metadata.

According to an aspect of the present disclosure, information describing the mosaicking is encoded in VANC/HANC metadata space of video data to facilitate downstream real-time reconstruction of raw video data.

According to an aspect of the present application multiple small fast frames are mosaicked into a large 1080p30 frame using multiple parallel 1080p30 video paths. The small fast frames are spread across multiple channels of an industry standard SMPTE292M 1080p30 video interface using currently fielded video architectures. According to another aspect of the present disclosure, a custom/proprietary timestamping and encoding scheme is generated and transported in the user defined Key Length Value (KLV) metadata space of each large 1080p30 frame to allow for simple reconstruction of the multiple SMPTE feeds into a single processed video stream.

The disclosed video transport method includes receiving raw video data from a high speed image sensor and mosaicking the video data into industry standard formats such as 1920×1080p30 encoded into SMPTE 292M, which is transported over a standard HD-SDI interface.

The disclosed video transport method uses standard SMPTE interfaces for the transport stream and encodes the data in a mosaic of images. According to an aspect of the present disclosure, packing details of the encoded mosaic of images is saved and transported in metadata along with the respective image data.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Figure 1:
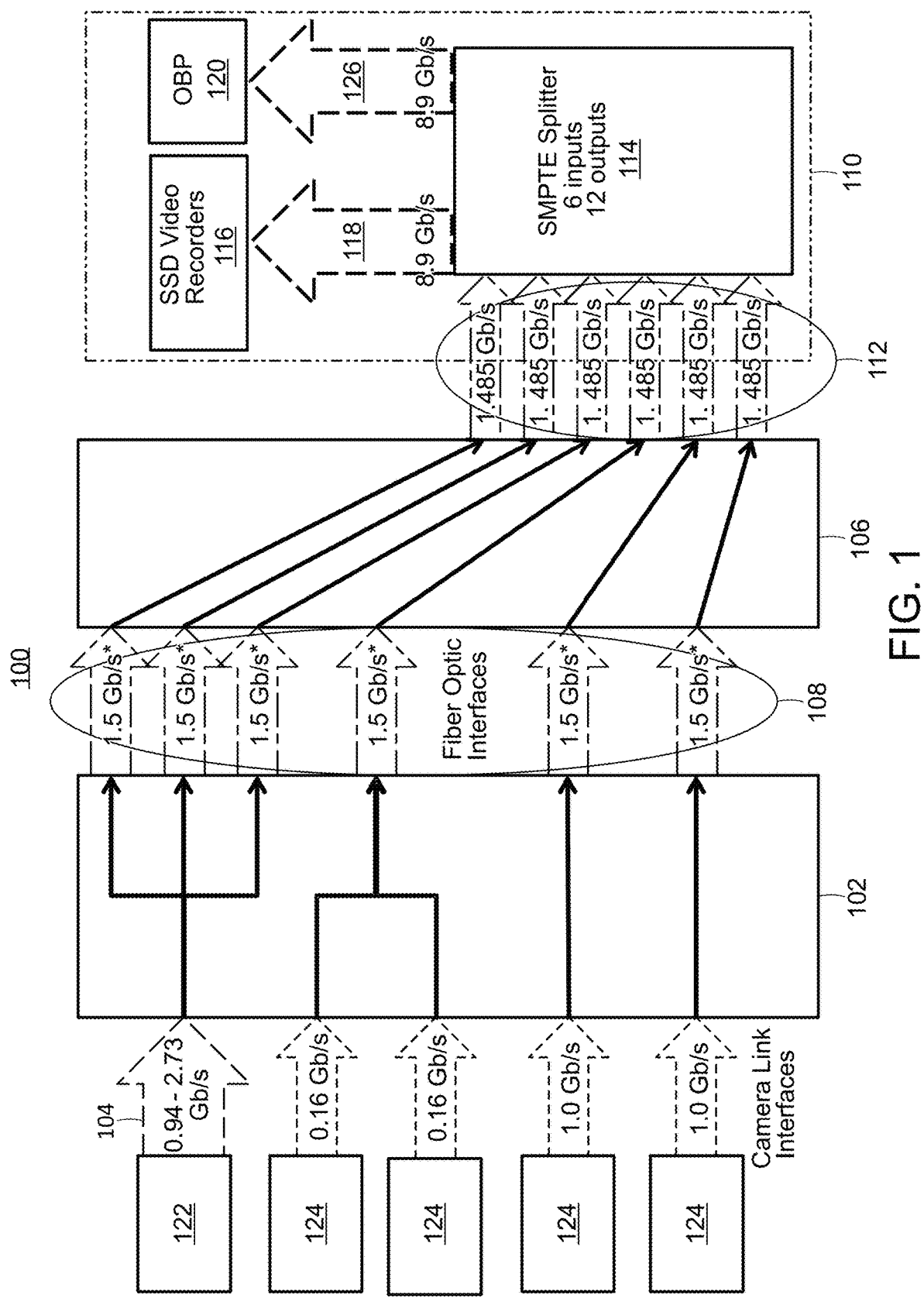
FIG. 1 is a diagram of an illustrative embodiment of a video data transport apparatus according to an aspect of the present disclosure.

Aspects of the present disclosure include a system and method for lossless communication and processing of high frame rate video data from one or more high frame rate image sensors using existing HD video architectures. Processing of high frame rate video data using currently available video architectures involves mosaicking high frame rate video frames from one or more high frame rate image sensors into a larger container frame. The container frames are combined and spread into multiple channels of HD video. In an illustrative embodiment, the high frame rate video data may be provided from a high frame rate image sensor in 128×128 pixels at greater than 1 kHz, which are mosaicked into 720p60 container frames. In the illustrative embodiment, the segments are combined into multiple channels of SMPTE424M 1080p60 video.

In an illustrative embodiment of the disclosed system, a high frame rate image sensor may be a polarimetric image sensor having a frame rate of greater than 1100 frames per second with small active focal planes generating frames having 144×1024 pixels at 1100 frames per second, for example. Aspects of the present disclosure include a system and method for transporting the small fast frames, such as frames received from a polarimetric image sensor, using an existing standard video transport architecture.

Reassembly and loss of video data in real time for visualization becomes problematic using existing compression techniques. Many existing commercially available architectures for transporting high frame rate video data employ temporal compression, which destroys metadata accuracy and integrity, destroys alignment of the metadata to video frames, reduces resolution and/or adds undesired latencies. Many techniques for transporting high frame rate video data are optimized to preserve frame rate and maintain visual appeal of displayed video. These types of architectures are unsuitable for transporting high frame rate video data in many applications such as surveillance wherein data accuracy and integrity of all metadata is more important than frame rate. In these applications it is important to reconstruct raw video data from the high frame rate video image sensor.

An aspect of the present disclosure includes a system for transporting and buffering raw fast frame rate video data from one or more HD video inputs such as frames received from a polarimetric high speed image sensor, for example. In an illustrative embodiment, the disclosed system mosaics and spreads the fast frame rate video data across three of eight channels in 1920×1080p30 video frames. In the illustrative embodiment, the system encodes packing information, spreading information, and unique ID/timestamps for each frame in KLV metadata and inserts the KVL metadata in ancillary metadata space, e.g. VANC and or HANC, of the 1080p30 video frames.

Another aspect of the present disclosure include a robust encoding scheme that generates the KLV metadata and ensures that the final video can be reassembled into its original fast frame rate form after being spread over multiple channels. In the illustrative embodiment, the packing information encoded in the KVL metadata describes how the fast frames are mosaicked into the 1080p30 frames. The spreading information encoded in the KVL metadata describes how the 1080p30 frames are directed across the multiple channels. The 1080p30 video frames can be unpacked by a back end processor using the KLV metadata information to regenerate the raw fast frame rate video data, which can then be buffered, displayed, recorded and/or subjected to post processing, for example.

An apparatus for transporting video data according to an aspect of the present disclosure is described with reference to FIG. 1. The apparatus 100 includes a video architecture turret 102 including video processing circuitry. A raw video data input path 104 is coupled to the video processor circuitry in the turret 102. The apparatus 100 also includes a SMPTE standard video processor 106 coupled to the video architecture turret 102 via a number of image data output paths 108 extending in parallel from the video processing circuitry in the turret 102 to the SMPTE standard video processor 106. In an illustrative embodiment the apparatus 100 includes eight 720p60 Hz image data output paths 108, which extend across a fiber optic slip ring interface, for example. A back end processor 110 is coupled to the standard video processor 106 via SMPTE video transport path 112.

In the apparatus 100 shown in FIG. 1, the video processor circuitry in the turret 102 is configured to receive high speed frames from a high frame rate sensor 122 on the raw video data input path 104, mosaic the high speed frames sequentially into standard 1080p30 sized frames, and spread the standard 1080p30 sized frames to a number of the image data output paths 108. The turret 102 may also be coupled to a number of HD image sensors 124, for example. In an illustrative embodiment, the standard 1080p30 sized frames are spread over three of the eight 720p60 Hz image data output paths 108. According to an aspect of the present disclosure, the processor circuitry in the turret 102 is also configured to encode metadata describing how the high speed frames are mosaicked into the standard 1080p30 sized frames and describing how the standard 1080p30 sized frames are spread to the number of the image data output paths. In an illustrative embodiment the metadata is encoded in a standard key-length-value (KLV) metadata format using a vertical ancillary (VANC) and/or horizontal ancillary (HANC) technique with packing and spreading information to facilitate unpacking and reconstruction of the image data. Persons skilled in the art should recognize that VANC and HANC are a conventional technique for embedding non-video information in a video signal. For example, the metadata includes packing details, such as pixel location (row, column) of start of frame and end of frame, frame rate (30, 60), bit depth (8, 10, 12, 16), and bit packing mode (two bytes per pixel, one byte per pixel, etc.), for example. The same metadata space has provisions for giving line of sight (inertial measurement unit (IMU), gyro, accelerometers, resolvers, servo state, encoder feedback, focus information, temperatures of the system optics, etc.) and/or pointing information indicating where an image sensor was pointed for each applicable frame. The information in the metadata can be used to add context to the video frames captured by an image sensor.

The KLV metadata includes a unique key for a corresponding metadata field and a length of the corresponding metadata field in the HANC space or VANC space of a corresponding 1080p30 sized frame. In the illustrative embodiment, the KLV metadata includes a metadata value including a data packet that describes how the 1080p30 sized frame it is packed with the smaller high speed frames. The metadata value includes sufficient information to identify the boundaries between high speed frames. For example, in an illustrative embodiment, the packet includes a unique identifier for each of the high speed frames and time stamp for each of the high speed frames.

The processor circuitry in the turret 102 is further configured to store the metadata in a standard ancillary metadata space of corresponding instances of the standard 1080p30 sized frames, and transport the standard 1080p30 sized frames along with the metadata to the SMPTE standard video processor 106 via the image data output paths 108. In an illustrative embodiment 58.8 megabytes of the metadata may be stored in VANC space or HANC space of each of the standard 1080p30 sized frames.

The SMPTE standard video processor 104 is configured to transport the standard 1080p30 sized frames along with the metadata to the back end processor 110 via the SMPTE video transport paths 112. The back end processor 110 is configured to unpack and reassemble the high speed frames from the standard 1080p30 sized frames based on the metadata stored in the standard 1080p30 sized frames.

In an illustrative embodiment of the apparatus 100 shown in FIG. 1, the metadata is KLV metadata stored in VANC space of the corresponding standard 1080p30 sized frame. According to an aspect of the present disclosure the KLV metadata includes an identifier and time stamp for each of the high speed frames.

In an illustrative embodiment, the backend processor 110 includes an SMPTE splitter 114 coupled to the SMPTE video transport paths 112. Video recorder circuitry 116 is coupled to the SMPTE splitter 114 via a first high speed bus 118, and on-board processing circuitry 120 is coupled to the SMPTE splitter 114 via a second high speed bus 126.

In an illustrative embodiment, the video recorder circuitry 116 may be configured to store the reassembled high speed video frames. The on-board processing circuitry 120 may be configured to provide real-time application specific output to an operator or downstream analysis system, to identify targets and/or to generating tracking information for example.

Figure 2:
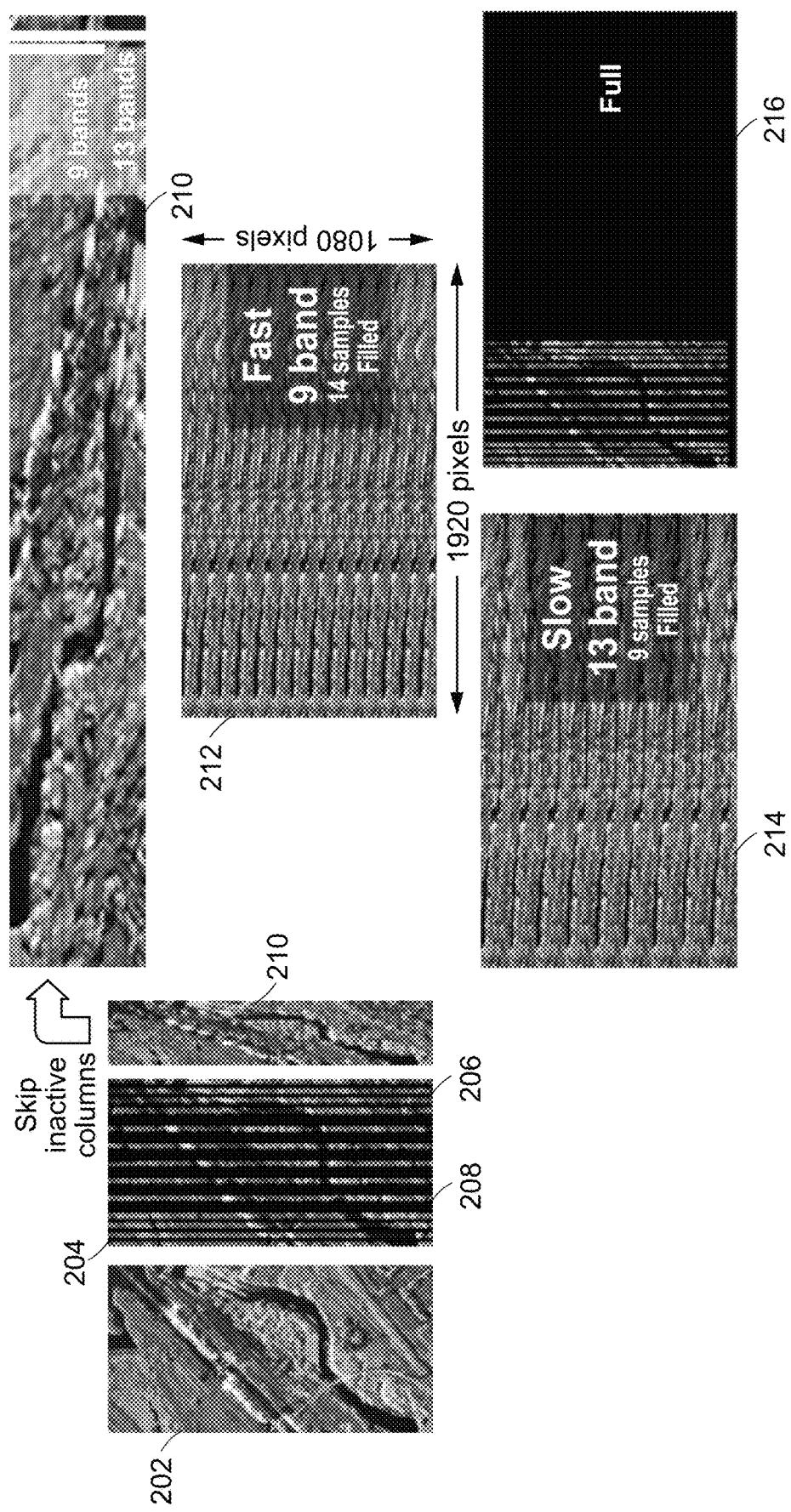
FIG. 2 is diagram illustrating multiple packing modes of video data for transporting according to an aspect of the present disclosure.

Another aspect of the present disclosure includes a method for transporting raw high speed video data using currently fielded video architectures. The method includes steps of generating a mosaic of multiple small fast frames in standard 1080p30 frames and spreading the small fast frames across multiple channels of SMPTE292M 1080p30 video 108. Different packing modes may be used in which the multiple small frames are mosaicked into standard 1080p30 frames in different ways for different applications or implementations of the disclosed system and method. Referring to FIG. 2, in an illustrative embodiment, the fast frames may be packed into standard 1080p30 frames three different ways to provide a fast mode, a slow mode and a full mode, for example. In this embodiment, an aperture image 202 having 530×1024 pixels is sensed by a high frame rate image sensor 122 of FIG. 1. The high rate image sensor 122 generates a detected high frame rate image frame 204. The detected high frame rate image frame 204 includes a number of bands 206 of raw data from the aperture image 202 and may also include a number of inactive columns 208. The bands 206 of each high frame rate image are concatenated and written to the standard 1080p30 frames 210 by video processor circuitry in the turret 102 of FIG. 1, omitting the inactive columns 208. The bands 206 of sequential high frame rate image frames 204 are written sequentially to the standard 1080p30 frames. The number of bands 206 that are packed into each of the standard 1080p30 frames 210 depends on the packing mode that is implemented or selected.

In the illustrative embodiment shown in FIG. 2, a fast mode may be implemented in which the high frame rate image frames 204 include 144×1024 pixels and are transported at 1100 frames per second. In the fast mode, each of the high frame rate image frames 204 fills 76.8 lines of a standard 1080p30 frame 212. A slow mode may be implemented in which the high frame rate image frames 204 include 208×1024 pixels and are transported at 800 frames per second. In the slow mode, each of the high frame rate image frames 204 fills 110.9 lines of a standard 1080p30 frame 214. A full mode may be implemented in which the high frame rate image frames 204 include all 530×1024 pixels of the aperture image 202, which are transported at 30 frames per second. In the full mode, each of the high frame rate image frames 204 fills 1024 lines of a standard 1080p30 frame 216.

According to an aspect of the present disclosure, the disclosed method includes steps of encoding packing information, spreading information, and unique ID/timestamp for each frame in SMPTE standard, user defined KLV metadata, and inserting the KLV metadata in the HANC and VANC of each standard video frame, such that no separate/new data bus is needed as described above with reference to FIG. 1. The KLV metadata includes sufficient information to reconstruct the multiple channels of SMPTE292M 1080p30 into a single processed video stream for reassembly of the original imagery. Implementations of the disclosed method and apparatus can be used to transport data from various new high speed cameras over an existing HD video architecture/hardware.

Figure 3:
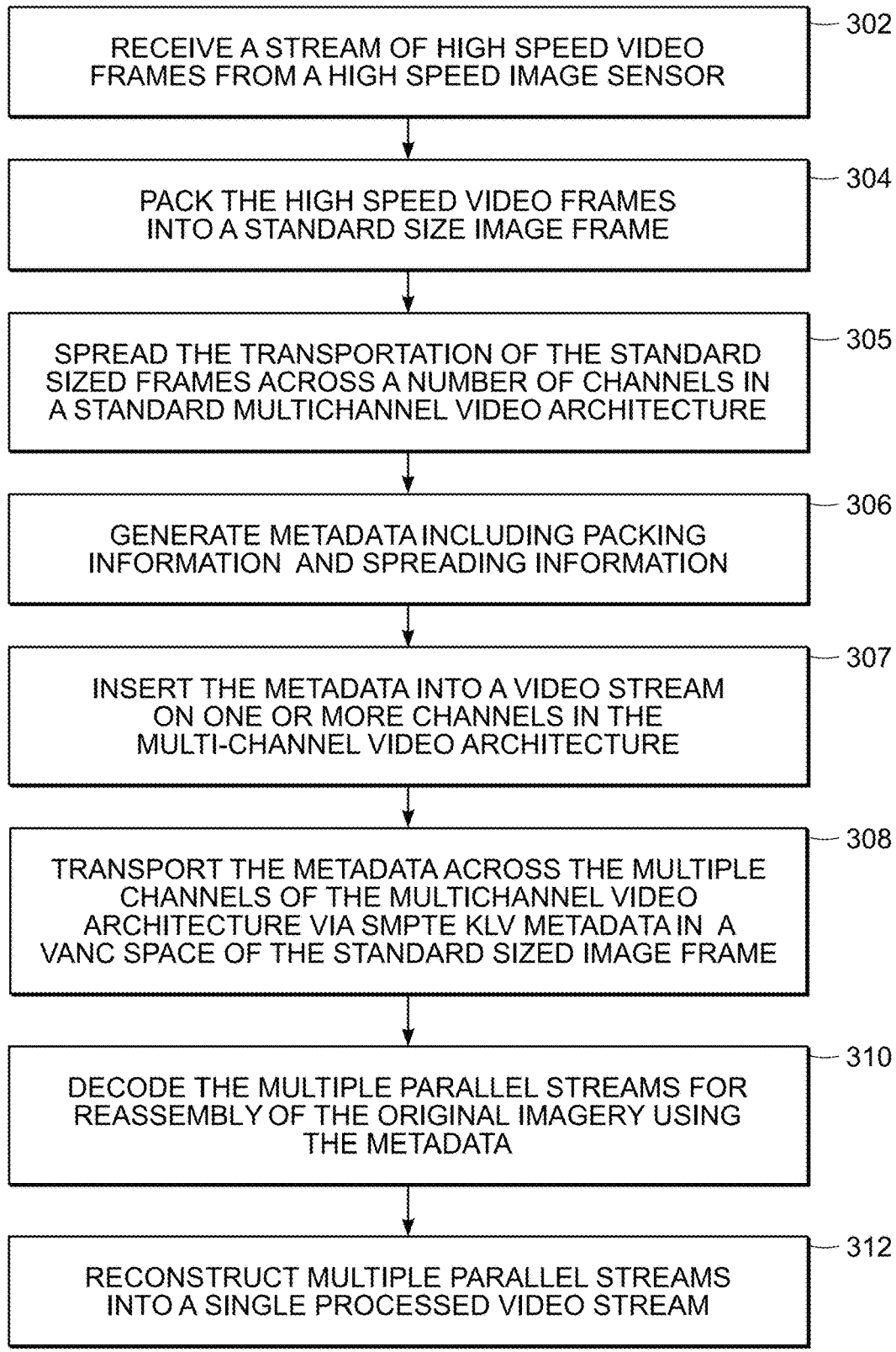
FIG. 3 is process flow diagram illustrating a method for transporting video data according to aspects of the present disclosure.

A method for transporting video data according to an aspect of the present disclosure is described with reference to FIG. 3. The method 300 includes receiving a stream of high speed video frames from a high speed image sensor at block 302 The method 300 includes packing the high speed video frames into a standard size image frame without compressing the high speed video frames at block 304. The packing is performed to include all of the data from the high speed image frames without compression so that the high speed frames may be reconstructed in their original form without loss of any data.

In an illustrative embodiment of the method 300, the standard sized image frame is a SMPTE292M 1080p30 video frame, the multichannel video architecture is a SMPTE292M 1080p30 video architecture and the metadata is encoded as SMPTE KLV metadata.

In an illustrative embodiment, the steps of receiving video frames 302 and packing the video frames 304 are performed by the video architecture turret 102 which receives the high speed video frames from the high frame rate sensor 122 as shown in FIG. 1. In an illustrative embodiment, each of the standard size image frames consists of sequentially packed high speed frames. Packing each of the standard sized frames is performed by temporally filling the high speed video frames into the larger standard sized frames, in a frame buffer.

At block 305, the method includes spreading the transportation of the standard sized frames across a number of channels in a standard multichannel video architecture. As the smaller frames are received from the high speed image sensor 122 (FIG. 1) and packed into the larger standard 1080p30 sized frames in the video architecture turret 102 the previously packed frames are transported from the video architecture turret 102 to the SMPTE video processor 106. In an illustrative embodiment, frame buffers in the video architecture turret 102 are packed with high speed frames to generate three standard 1080p30 sized frames. The three standard 1080p30 frames are filled sequentially in frame buffers of the video architecture turret at a high frame rate then read in parallel from the frame buffers in the video architecture turret 102 by the SMPTE video processor 106 at a slower frame rate of 30 Hz to purge the frame buffers. While the frame buffers are being read by the SMPTE video processor 106, additional frame buffers in the video architecture turret 102 are filled with the next high speed frames.

In an illustrative embodiment of the method 300, the standard sized image frame is a SMPTE292M 1080p30 video frame, the multichannel video architecture is a SMPTE292M 1080p30 video architecture and the metadata is encoded as SMPTE KLV metadata. In the illustrative embodiment, the metadata is included in VANC space and/or HANC space of the SMPTE292M 1080p30 video frame.

Although illustrative embodiments of the disclosed method and apparatus are described with reference to standard 1080p30 sized frames, it should be understood that various embodiments of the disclose systems and methods can be implemented using standard 720p60 sized frames instead of 1080p30 sized frames or in addition to 1080p30 sized frames. The standard 720p60 frames are read at 60 Hz to purge the frame buffers. Because the 720p60 frames are smaller than 1080p30 sized frames, the resulting bandwidth for transporting video data is approximately to the same for the standard 1080p30 sized frames and 720p60 sized frames.

For example, in FIG. 1, two of the HD image sensors 124 may be 1080p30 sensors and two of the other image sensors 124 may be 720p60 sensors. According to an aspect of the present disclosure frame buffers inside the video architecture turret 102 may be filled at the same or different rates, but the frame buffers are all read by the SMPTE video processor 106 at the same rate, e.g., either 30 Hz for standard 1080p30 sized frames or 60 Hz for standard 720 p60 sized frames.

At block 306, the method includes generating SMPTE KLV metadata including packing information that describes how the plurality of high speed video frames are packed into the standard sized image frame and spreading information that describes how the standard sized frames are spread across the parallel channels. In an illustrative embodiment, the metadata is included in VANC space and/or HANC space of the SMPTE292M 1080p30 video frame.

In an illustrative embodiment the metadata includes a unique identifier and time stamp for each of the plurality of high speed frames. At block 307, the method includes inserting the metadata into a video stream on one or more channels in the multi-channel video architecture. The metadata can be inserted into the VANC or HANC space of a corresponding standard 1080p30 sized frame or a standard 720p60 sized frame in the video architecture turret and/or in the SMPTE video processor 106 (FIG. 1). For example, metadata that is applicable to functionality of the video architecture turret, such as pointing information, and line of sight information can be added by the video architecture turret to the VANC or HANC space of the corresponding 1080p30 frames. Additional information such as precision timing information for correlating video with universal time can be added by the SMPTE video processor to the VANC or HANC space while the corresponding 1080p30 frames.

At block 308, the method 300 includes transporting the SMPTE KLV metadata across the multiple channels of the multichannel video architecture in the VANC space the corresponding standard 1080p30 frames. At block 310, the method includes decoding the SMPTE KLV metadata in the standard 1080p30 frames received via the multiple parallel streams for reassembly of the original imagery. At block 312, the method includes reconstructing multiple parallel streams into a single processed video stream.

In an illustrative embodiment the decoding step 310 and reconstructing step 312 can be performed by the back end processor 110 shown in FIG. 1 which reads the SMPTE KLV metadata from the HANC or VANC space of the standard 1080p30 frames and decodes the metadata. The decoded value in the KLV metadata identify boundaries between the small fast frames and sequencing information for the small fast frames that are packed in the corresponding standard 1080p30 sized frames.

While aspects of the present disclosure have been particularly shown and described with reference to the exemplary embodiments thereof, it will be understood by those of ordinary skill in the art that various changes in form and detail may be made therein without departing from the scope of the present disclosure as defined by the following claims.

The invention claimed is:

1. A method for transporting video data, comprising:
   generating a plurality of high speed video frames a first frame rate greater than 1 kilohertz by sensing an aperture image, each of the high speed video frames having 128×128 pixels, wherein each of the high speed video frames includes a plurality of bands of the aperture image;

mosaicking the video data in the plurality of high speed video frames into a 720p60 standard or SMPTE292M 1080p30 standard size container frame, wherein the mosaicking is performed by concatenating the plurality of bands from the high speed video frames without compressing the high speed video frames;

generating metadata that describes how the plurality of high speed video frames are packed into the standard sized container frame;

transporting the standard sized container frame across multiple parallel channels in a multichannel video architecture at a frame rate less than or equal to the first frame rate; and transporting the metadata across the parallel channels of the multichannel video architecture.

2. The method of claim 1, wherein the metadata includes a unique identifier for each of the plurality of high speed frames and time stamp for each of the plurality of high speed frames.

3. The method of claim 1, further comprising:
decoding the metadata; and
reassembling the high speed video frames based on the decoded metadata.

4. The method of claim 1, further comprising receiving the high speed video frames from a high speed image sensor.

5. The method of claim 1, further comprising:
packing each of a plurality of standard sized container frames with respective portions of the plurality of high speed video frames; and
spreading transportation of the plurality of standard sized container frames across the multiple parallel channels in the multichannel video architecture;
wherein the metadata further includes spreading information that describes how the plurality of standard sized container frames are spread across the multiple parallel channels.

6. The method of claim 5, further comprising inserting the metadata into a video stream on one or more of the multiple parallel channels.

7. The method of claim 5, further comprising:
decoding the metadata; and
reassembling the high speed video frames based on the decoded metadata.

8. The method of claim 7, further comprising reconstructing a processed video stream including the reconstructed high speed video frames.

9. The method of claim 1, further comprising receiving the high speed video frames from a high speed image sensor.

10. The method of claim 1, wherein the metadata includes a unique identifier and time stamp for each of the plurality of high speed frames.

11. The method of claim 1, wherein the multichannel video architecture is a SMPTE292M 1080p30 video architecture.

12. The method of claim 11, further comprising:
encoding the metadata as SMPTE KLV metadata; and
including the metadata in VANC space and/or HANC space of the standard size container frame.

13. The method of claim 5, wherein packing each of the plurality of standard sized container frames comprises arranging the high speed video frames as mosaics in the standard sized image container frames.

14. An apparatus for transporting video data, comprising:
a video architecture turret including video processing circuitry;
a raw video data input path coupled to the video processor circuitry in the video architecture turret;
a SMPTE standard video processor coupled to the video architecture turret via a plurality of image data output paths extending in parallel from the video processing circuitry in the video architecture turret to the SMPTE standard video processor; and
a back end processor coupled to the standard video processor via a SMPTE video transport path,
wherein the video processor circuitry in the in the video architecture turret is configured to:
receive high speed frames from a high speed image sensor on the raw video data input path, at a frame rate greater than or equal to 1 kilohertz, wherein each of the high speed frames has 128×128 pixels and wherein each of the high speed video frames includes a plurality of bands of an aperture image;
mosaic the high speed frames sequentially into standard 1080p30 sized frames by concatenating the plurality of bands from the high speed frames into the standard 1080p30 sized frames without compressing the high speed video frames; and
spread the standard 1080p30 sized frames to a number of the image data output paths.

15. The apparatus of claim 14, wherein the video processor circuitry in the video architecture turret is also configured to encode metadata describing how the high speed frames are mosaicked into the standard 1080p30 sized frames and describing how the standard 1080p30 sized frames are spread to the number of the image data output paths.

16. The apparatus of claim 15, wherein the video processor circuitry in the video architecture turret is further configured to store the metadata in a standard ancillary metadata space of corresponding instances of the standard 1080p30 sized frames, and transport the standard 1080p30 sized frames along with the metadata to the SMPTE standard video processor via the image data output paths.

17. The apparatus of claim 16, wherein the SMPTE standard video processor is configured to transport the standard 1080p30 sized frames along with the metadata to the back end processor via the SMPTE video transport paths, and wherein the back end processor is configured to unpack the high speed frames from the standard 1080p30 sized frames based on the metadata stored in the standard 1080p30 sized frames.

18. The apparatus of claim 15, wherein the metadata is KLV metadata stored in VANC space of the corresponding standard 1080p30 sized frame.

19. The apparatus of claim 18, wherein the KLV metadata includes an identifier and time stamp for each of the high speed frames.

* * * * *